US011178245B2

(12) United States Patent
Hilber et al.

(10) Patent No.: US 11,178,245 B2
(45) Date of Patent: Nov. 16, 2021

(54) DISTRIBUTED CLUSTER VISUALIZATION

(71) Applicant: New Relic, Inc., San Francisco, CA (US)

(72) Inventors: Andreas Hilber, Barcelona (ES); Emiliano Castro, Barcelona (ES)

(73) Assignee: New Relic, Inc., San Francisco, CA (US)

( * ) Notice: Subject to any disclaimer, the term of this patent is extended or adjusted under 35 U.S.C. 154(b) by 23 days.

(21) Appl. No.: 16/459,278

(22) Filed: Jul. 1, 2019

(65) Prior Publication Data

US 2021/0006637 A1 Jan. 7, 2021

(51) Int. Cl.
*H04L 29/08* (2006.01)
*H04L 12/26* (2006.01)

(52) U.S. Cl.
CPC ........ *H04L 67/2833* (2013.01); *H04L 43/045* (2013.01); *H04L 67/025* (2013.01)

(58) Field of Classification Search
CPC .............. H04L 67/2833; H04L 67/32; H04L 43/045; H04L 67/025; H04L 41/0246; H04L 43/00; H04L 67/125; H04L 41/22; H04L 67/3833; G06F 11/32
See application file for complete search history.

(56) References Cited

U.S. PATENT DOCUMENTS

| | | | | |
|---|---|---|---|---|
| 7,437,611 B2 * | 10/2008 | Agarwal | ............. | G06F 11/0709 714/26 |
| 8,572,735 B2 * | 10/2013 | Ghosh | ................ | H04L 63/1416 726/23 |
| 9,043,332 B2 * | 5/2015 | Noel | .................... | G06F 11/0709 707/741 |
| 9,218,463 B2 * | 12/2015 | Harjula | .................... | G06F 21/57 |
| 9,311,899 B2 * | 4/2016 | Kandogan | ............ | G06K 9/6221 |
| 9,721,026 B1 * | 8/2017 | Tober | ...................... | H04L 67/10 |
| 10,691,523 B2 * | 6/2020 | Noel | ....................... | G06N 5/022 |
| 10,831,864 B2 * | 11/2020 | Kostirev | ................. | G06F 16/00 |
| 2002/0091805 A1 * | 7/2002 | Phillips | .................. | G06F 9/4406 709/220 |
| 2006/0101308 A1 * | 5/2006 | Agarwal | ............. | G06F 11/3409 714/25 |
| 2008/0235365 A1 * | 9/2008 | Bansal | .................... | H04L 43/16 709/224 |
| 2013/0110761 A1 * | 5/2013 | Viswanathan | ......... | G06N 20/00 706/52 |

(Continued)

*Primary Examiner* — Sargon N Nano
(74) *Attorney, Agent, or Firm* — Fenwick & West LLP

(57) ABSTRACT

A system retrieves cluster data for a cluster including one or more nodes and one or more pods. The system displays, on a visual interface, a cluster visualization based on the retrieved cluster data. The cluster visualization includes, for each of the one or more nodes, a node spoke graphical element. Each node spoke graphical element includes a pod region indicating pods of the node and a health region indicating one or more health metrics of the node. A particular pod of the one or more pods in the cluster data is represented in the cluster visualization by a pod graphical element at the pod region of a node graphical element of a node corresponding to the particular pod. A graphical feature of the pod graphical element is indicative of at least one of one or more health metrics of the particular pod and one or more health metrics of a pod element within the particular pod.

20 Claims, 10 Drawing Sheets

(56) References Cited

U.S. PATENT DOCUMENTS

| | | | | |
|---|---|---|---|---|
| 2013/0207980 A1* | 8/2013 | Ankisettipalli | ....... | G06T 11/206 345/440 |
| 2014/0075327 A1* | 3/2014 | Noel | ...................... | G06N 5/022 715/744 |
| 2014/0104310 A1* | 4/2014 | Kandogan | ............. | G06T 11/206 345/629 |
| 2014/0229768 A1* | 8/2014 | Bernstein | ............ | G06F 11/0709 714/39 |
| 2015/0199226 A1* | 7/2015 | Wu | ..................... | G06F 11/0709 714/37 |
| 2015/0324090 A1* | 11/2015 | Kostirev | ............. | G06F 3/04817 715/835 |
| 2015/0355959 A1* | 12/2015 | Kogan-Katz | ....... | G06F 11/0736 714/57 |
| 2016/0171731 A1* | 6/2016 | Kandogan | ............... | G06T 11/60 345/629 |
| 2016/0342454 A1* | 11/2016 | Noel | ................... | G06F 11/0751 |
| 2020/0136933 A1* | 4/2020 | Raskar | ................ | H04L 41/5054 |
| 2020/0211241 A1* | 7/2020 | Prieditis | ................ | G06N 20/00 |

\* cited by examiner

DISTRIBUTED CLUSTER VISUALIZATION

TECHNICAL FIELD

The disclosure relates generally to the field of graphical visualizations and in particular to the field of visualizing distributed computing clusters.

BACKGROUND

Many modern software applications are built using distributed software architectures rather than traditional monolithic paradigms. Distributed software architectures often have complex designs where one software application is implemented as numerous containerized microservices. Multiple instances of the containers may be hosted by many different computing nodes in a cluster of computing nodes. The number of instances of the containers deployed within the cluster may vary on a per-container basis responsive to throughput of (e.g., demand for) the one or more microservices within the container, and can vary over time. Container orchestration systems automate deployment, scaling, and management of the software application upon the cluster. Real-time or near real-time visualization of the cluster and its often-changing components, particularly to monitor performance, can be difficult.

SUMMARY

Visualizing data from a distributed application cluster involves a monitoring server retrieving cluster data from the distributed application cluster. The distributed application cluster includes one or more nodes running one or more pods. The monitoring server generates a cluster visualization based on the retrieved cluster data. The system displays, on a visual interface, the generated cluster visualization based on the retrieved cluster data.

The cluster visualization includes, for each of the one or more nodes, a node spoke graphical element. Each node spoke graphical element includes a pod region indicating pods of the node and a health region indicating one or more health metrics of the node. A particular pod of the one or more pods in the cluster data is represented in the cluster visualization by a pod graphical element at the pod region of a node graphical element of a node corresponding to the particular pod. A graphical feature of the pod graphical element is indicative of at least one of one or more health metrics of the particular pod and one or more health metrics of a pod element within the particular pod.

BRIEF DESCRIPTION OF THE DRAWINGS

Figure (FIG. 1 is a block diagram illustrating a system for visualizing the structure and health of a distributed application cluster, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. General Overview

How to best visualize the structure and health of a cluster running a distributed application is an ongoing problem. Simple metrics and graphs often fail to represent the structure of the cluster or otherwise lack information informative of the health of the cluster, particularly in real or near-real time. Visualizing various cluster data as a series of graphs and metrics can lead to visualizations that are not user friendly and do not fit into one interface. The described embodiments provide for a cluster monitoring solution—a cluster visualization that visualizes the cluster and its health in a user-friendly manner. The cluster visualization also provides greater detail into the structure and real or near-real time status of the cluster than extant metrics or graphs.

Figure 1:
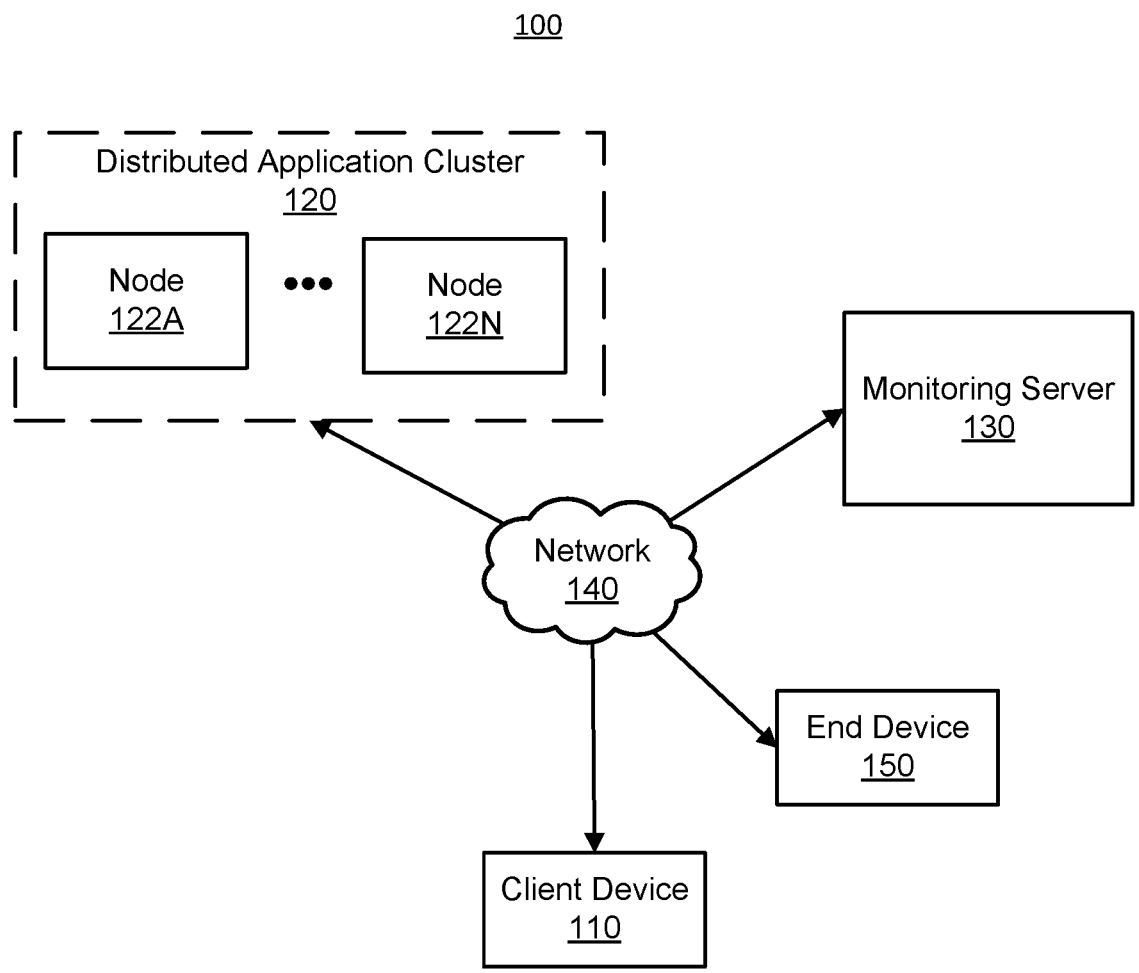

FIG. 1 uses like reference numerals to identify like elements. A letter after a reference numeral, such as "122A," indicates that the text refers specifically to the element having that particular reference numeral. A reference numeral in the text without a following letter, such as "122," refers to any or all of the elements in the figures bearing that reference numeral. For example, "122" in the text refers to reference numerals "122A," and/or "122N" in the figures.

II. System Overview

FIG. 1 is a block diagram illustrating a system 100 for visualizing the structure and health of a distributed application cluster 120, according to one embodiment. The system 100 includes a client device 110, the distributed application cluster 120, a monitoring server 130, and an end device 150 connected by a network 140. The distributed application cluster 120 is a cluster of nodes 122 each running one or more pods. Each pod includes one or more containers running microservices that collectively provide a distributed application. Depending upon the embodiment, the pods may themselves simply be containers, or virtual machines. However, for clarity the present disclosure refers to the embodiment wherein containers run in pods. Depending upon the embodiment, one or more pods may not include any containers, e.g., upon initialization before containers are added. Furthermore, as part of running microservices that collectively provide the distributed application, containers may additionally run services such as databases or internal container orchestration platform services. The cluster of nodes 122 is managed by a container orchestration platform, such as KUBERNETES. The container orchestration platform operates upon the distributed application cluster 120, and may additionally operate at the monitoring server 130 and/or client device 110 depending upon the embodiment.

The client device 110 is a personal computer, laptop, mobile device, or other computing device that includes a visual interface, e.g., a display. The client device 110 displays, at the visual interface, one or more user interfaces visualizing the structure and health of the distributed application cluster 120. In some embodiments, the client device 110 accesses the distributed application cluster 120 over the network 140 and can manage the distributed application cluster 120, e.g., send instructions to the distributed application cluster 120 to control operation and/or configuration of the distributed application cluster 120.

The end device 150 accesses and uses the distributed application hosted at the distributed application cluster 120 via the network 140. For example, the end device 150 sends a request for data to the distributed application cluster 120, which forwards the request to a pertinent node 122 (e.g., one of nodes 122A to 122N), where a containerized microservice processes the request and then sends the requested data to the end device 150. The pertinent node 122 is a node 122 with a pod running an instance of the containerized microservice requisite for responding to the data request, and may be selected from multiple nodes running instances of the containerized microservice using a selection process, such as a round robin algorithm, or by ranking the multiple nodes by resource use (e.g., processor, memory, non-transitory storage) and selecting the least-used node. In an embodiment, some or all of the functionality of the end device 150 may also or instead be performed at the client device 110, and the system 100 may not include an end device 150.

The monitoring server 130 retrieves data from the distributed application cluster 120 and generates the one or more user interfaces, which the monitoring server 130 sends to the client device 110 for display. The generated one or more user interfaces include graphical elements representative of the structure and health of the distributed application cluster 120, as further described below. Depending upon the embodiment, some or all of the monitoring server 130 functionality may instead be performed at the client device 110, and the system 100 may not include the monitoring server 130.

In some embodiments, the system 100 includes more than one client device 110, distributed application cluster 120, monitoring server 130, and/or end device 150. For example, the monitoring server 130 may itself be a distributed application cluster that provides monitoring server 130 functionality as the distributed application. Alternatively or additionally, in some embodiments, the monitoring server 130 can access and/or send instructions to the distributed application cluster 120.

The client device 110, nodes 122, monitoring server 130, and end device 150 are configured to communicate via the network 140, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

Figure 2:
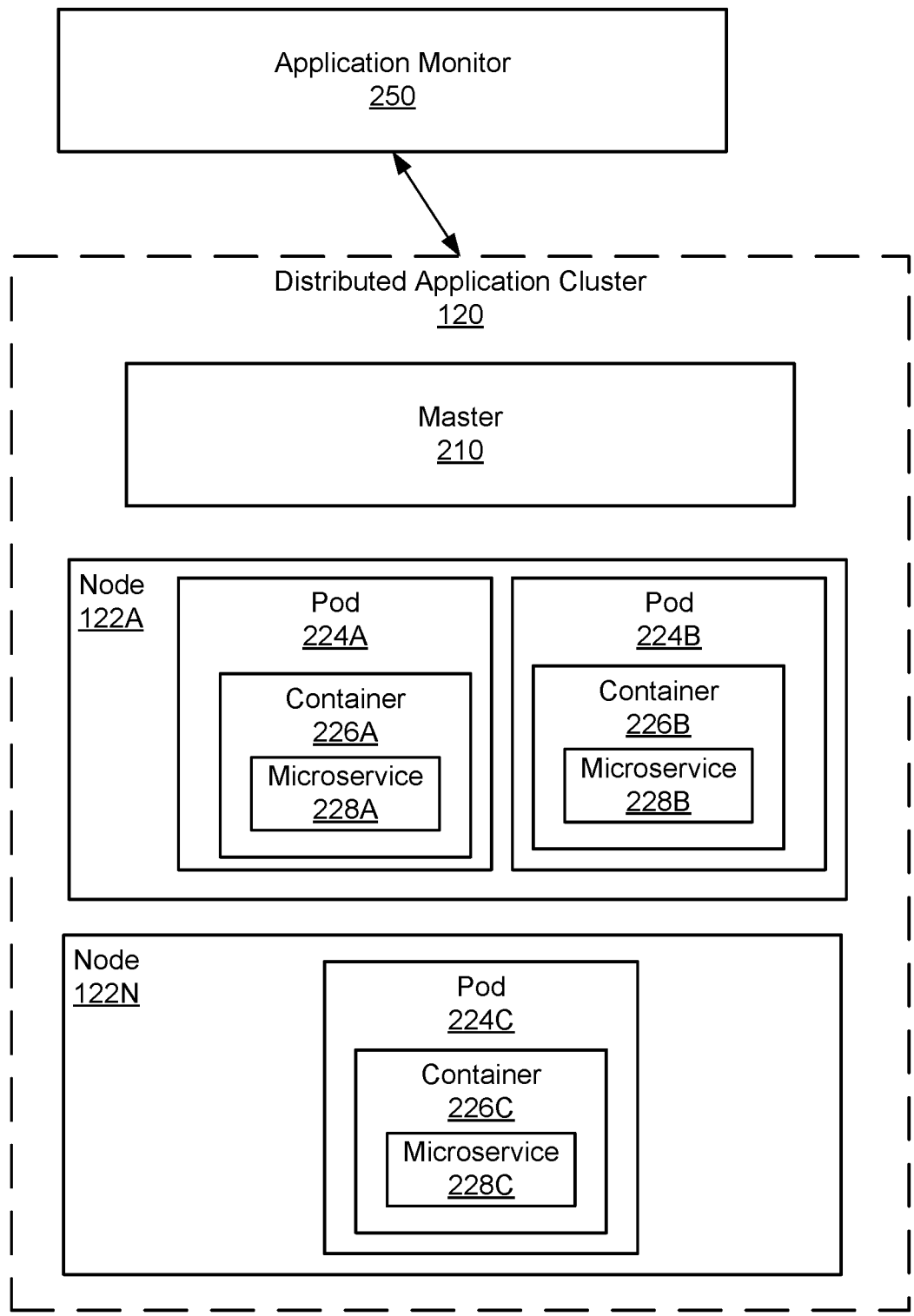
FIG. 2 is a block diagram illustrating a distributed application cluster, according to one embodiment.

FIG. 2 is a block diagram illustrating the distributed application cluster 120, according to one embodiment. The distributed application cluster 120 includes a master 210 and two nodes 122, and is connected to an application monitor 250. In some embodiments the application monitor 250 is not part of the distributed application cluster 120, and instead is at the monitoring server 130, where it receives data from the distributed application cluster 120, e.g., from the master 210.

Node 122A includes two pods 224A,B and node 122N includes pod 224C. Each pod 224 includes a container 226 with a microservice 228. Depending upon the embodiment, the distributed application cluster 120 can include fewer or more than two nodes 122, and each node 122 may include one, two, or more than two pods 224. In some embodiments, some nodes 122 include no pods 224, e.g., nodes 122 that have recently been added to the distributed application cluster 120, to which pods are to be added by the container orchestration platform. Pods that have yet to be added to a node 122 by the container orchestration platform are "unassigned" or "pending" pods.

Multiple of the microservices 228 may be different copies of the same microservice 228, although in some embodiments all the microservices 228 may be different. For example, in one embodiment, microservice 228A and microservice 228C are different instantiations of a first microservice that provides first functionality, while microservice 228B is a second microservice that provides second functionality. Together, the microservices 228 provide a distributed application. For example, microservice 228A could be a function to query a database, microservice 228B could be a function to add or remove data in the database, and microservice 228C could be a function to generate graphs based on retrieved database data, cumulatively providing a database interface application.

The master 210 is a component of the container orchestration platform that manages the distributed application cluster 120. It monitors microservice 228 usage and adds and removes pods 224 to the nodes 122 in response to the usage. The master 210 also monitors the nodes 122, and reacts to downed nodes. For example, node 122N loses its network connection, then the master 210 instructs node 122A to add an instance of pod 224C, thereby restoring the functionality lost when node 122N went offline. The master 210 may add or remove nodes 122 based on node usage, e.g., how much of each node's 122 processing units, memory, and persistent storage is in use.

The application monitor 250 monitors the distributed application cluster 120, collecting cluster data for the distributed application cluster 120. For example, the application monitor 250 tracks the application monitor's 250 nodes 122, the usage of each node 122 (e.g., in terms of processor use, memory use, and persistent storage use), which pods 224 are on each node, the usage of each pod 224 (e.g., in terms of microservice use), which if any pods are unassigned, and so on. Depending upon the embodiment, the application monitor 250 may reside upon the distributed application cluster 210 as in the figure, and/or upon the monitoring server 130 and/or client device 110.

Figure 3:
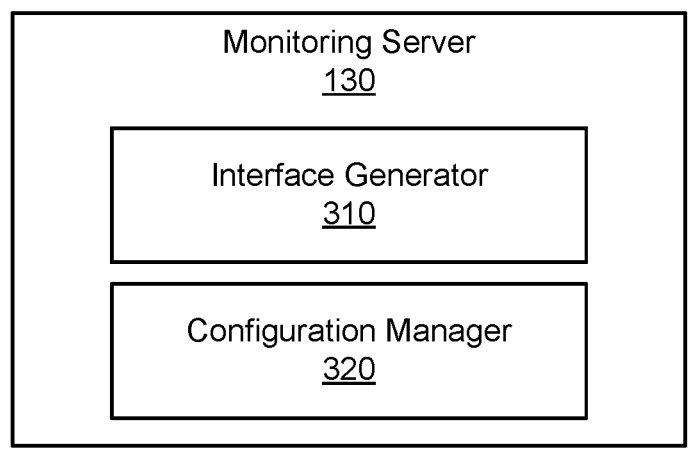
FIG. 3 is a block diagram illustrating a monitoring server, according to one embodiment.

FIG. 3 is a block diagram illustrating the monitoring server 130, according to one embodiment. The monitoring server 130 generates cluster visualizations based on cluster data collected by the application monitor 250. The monitoring server 130 includes an interface generator 310 and a configuration manager 320.

The interface generator 130 uses cluster data to generate cluster visualizations. The interface generator 130 may generate one or more cluster visualizations, such as those described below with reference to FIGS. 5-8. The interface generator 130 may provide real or near-real time functionality by periodically generating cluster visualizations for the same distributed application cluster 120. For example, the application monitor 250 collects new data every ten seconds, and the interface generator 130 generates a new cluster visualization for each new batch of data collected by the application monitor 250. The interface generator 130 sends the generated cluster visualizations to the client device 110.

The configuration manager 320 manages the configuration of the interface generator 130 and/or application monitor 250. For example, the configuration manager 320 manages the configuration of alert conditions. An alert condition is an event listener/handler that monitors particular cluster data and, responsive to the monitored cluster data meeting or surpassing one or more alert thresholds, sends a health alert to the application monitor 250 that the one or more alert thresholds have been met or surpassed. Meeting or surpassing an alert threshold indicates a node or a pod has encountered a health problem, e.g., has run out of persistent storage space. There may be one or more alert thresholds depending upon the embodiment, and different alert thresholds may correspond to different health alerts. For example, in one embodiment, there are two alert thresholds for each alert condition, a first alert threshold corresponding to a "warning" health alert and a second alert threshold corresponding to a "critical" health alert. Meeting or surpassing a threshold may be based on whether one data point meets or exceeds a threshold, or may be based on whether the average of a time-series of data, e.g., a rolling ten second window of data, meets or exceeds the threshold. Data pertaining to various health alerts are collectively "health metrics."

There may be one or more default alert conditions, and the configuration manager 320 may be used to add or remove alert conditions. In an embodiment, there are six default alert conditions, each having two alert thresholds. The first default alert condition is processor usage, where the first alert threshold is at seventy percent usage for a particular length of time and the second alert threshold is at eighty-five percent usage for a particular length of time.

The second default alert condition is memory usage, where the first alert threshold is at eighty percent usage for a particular length of time and the second alert threshold is at ninety-five percent usage for a particular length of time.

The third default alert condition is pod scheduling capacity, regarding whether the master 210 can schedule a pod to run on a particular node or group of nodes. The first alert threshold may be the master 210 being unable to schedule a pod to a particular node for two minutes, and the second alert threshold may be the master 210 being unable to schedule the pod for seven minutes.

The fourth default condition is pod readiness, regarding whether a pod is functional, or "ready." The first alert threshold may be if a pod is not ready in three minutes, and the second alert threshold may be if the pod is not ready in five minutes.

The fifth default condition is persistent storage usage, where the first alert threshold is at seventy-five percent usage for a particular length of time and the second alert threshold is at ninety percent usage for a particular length of time.

The sixth default condition is whether the master 210 can maintain a stable set of pods 224, e.g., for a particular pod 224, whether there are as many instances of that pod within the distributed application cluster 120 as the master 210 has attempted to schedule. The alert thresholds may be lengths of time for which the number of running instances of the pod does not match the number of running instances of the pod the master 210 has attempted to schedule.

Figure 4:
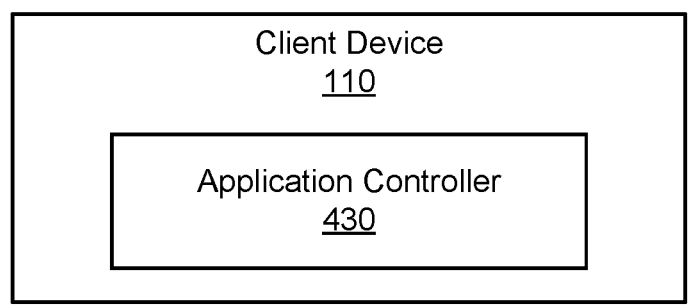
FIG. 4 is a block diagram illustrating a client device, according to one embodiment.

FIG. 4 is a block diagram illustrating the client device 110, according to one embodiment. The client device 110 includes an application controller 430, which controls the distributed application run by the distributed application cluster 120. The application controller 430 provides the microservice templates that are instantiated in the distributed application cluster 120 as the microservices 228. The application controller 430 can update one or more microservice templates and propagate those microservice templates to the distributed application cluster 120, which replaces the former microservices 228 with the instances of the updated microservice templates. In some embodiments, one client device 110 has the application controller 430 and does not receive or display cluster visualizations, and a second client device 110 does not have the application controller 430 but does receive and display cluster visualizations. Additionally, some or all of the functionality of the monitoring server 130 may instead or additionally reside upon the client device 110, e.g., the interface generator 310 and the configuration manager 320, as well as, in some embodiments, the application monitor 250.

III. User Interfaces

Figure 5:
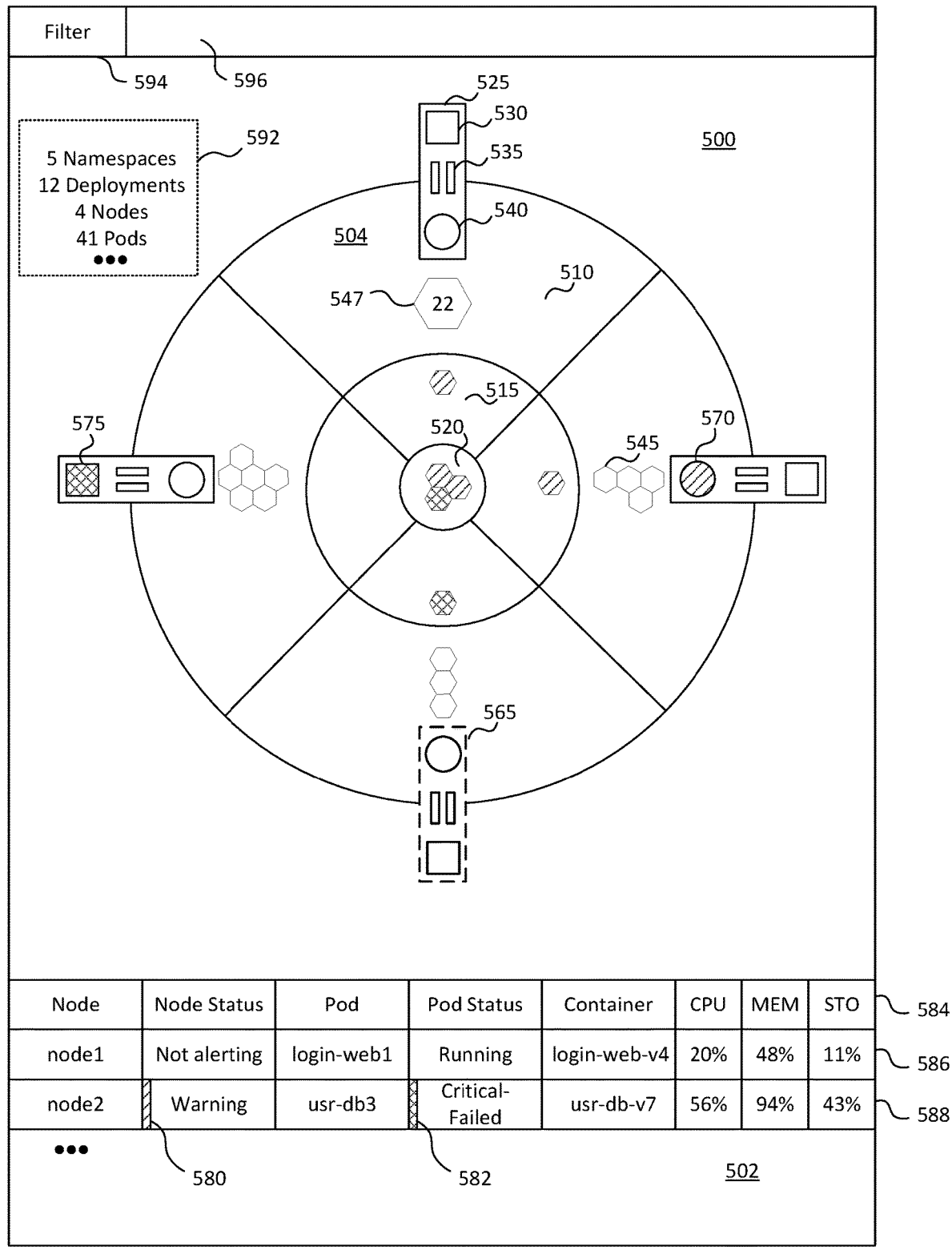
FIG. 5 illustrates a primary user interface visualizing distributed application cluster structure and health, according to one embodiment.

FIG. 5 illustrates a primary user interface visualizing distributed application cluster structure and health, according to one embodiment. The primary user interface includes a cluster visualization 500 and a pod chart 502. The cluster visualization 500 includes a node spoke graphical element 504, which has a health region 525 and a pod region. The pod region is the combination of a running pod region 510 and an alerting pod region 515. The center of the cluster visualization is a pending pod region 520 that is not specific to any one node. The cluster visualization 500 includes a node spoke graphical element 504 for each node in the distributed application cluster 120, which in the embodiment of the figure is four nodes. In alternative embodiments there may be more or fewer than four node spoke graphical elements 504, depending on how many nodes 122 are in the distributed application cluster 120. Each node 122 is represented by a node spoke graphical element 504 in the cluster visualization 500 with a size (e.g., central angle) proportional to the number of nodes in the distributed application cluster 120. For example, a cluster visualization 500 representing four nodes has four node spoke graphical elements 504 each with a central angle of ninety degrees, whereas a cluster visualization representing eight nodes has eight node spoke graphical elements 504 each with a central angle of forty-five degrees. In an embodiment, the cluster visualization 500 visualizes a subset of the total number of nodes in a distributed application cluster 120, which may be based on a number of health alerts per node. For example, the cluster visualization 500 may be configured such that it visualizes the eight nodes in a distributed application cluster 120 with the most active health alerts.

The cluster visualization 500 represents a distributed application cluster 120 in terms of its nodes and the pods at each node. The cluster visualization 500 may update periodically based on newly retrieved cluster data, e.g., recent health alerts. For example, the monitoring server 130 may retrieve cluster data from the distributed application cluster 120 via the application monitor 250 every ten seconds, and may generate an updated cluster visualization 500 every ten seconds, which it sends to the client device 110.

The health region 525 represents the health of the node 122 represented by the node spoke graphical element 504 of which the health region 525 is a part. The health region 525 includes a processor health graphical element 530, a memory health graphical element 535, and a storage health graphical element 540, though in alternative embodiments may have fewer, other, or additional health graphical elements representing other aspects of the node, such as a networking component.

The processor health graphical element 530 represents the health of the node's 122 one or more processors, in terms of alert conditions as described above. If one or more warning health alerts for the node are received, a graphical feature of the processor health graphical element 530 changes from a default state to a warning state, and if one or more critical health alerts for the node are received, the graphical feature of the processor health graphical element 530 changes to a critical state. The graphical feature can be any visual aspect of the processor health graphical element 530. For example, the graphical feature can be color, texture, pattern, animation, and so on. As a particular example, the default state can be a white color, the warning state can be an orange color, and the critical state can be a red color. In FIG. 5, a crosshatching fill pattern indicates critical state. As such, processor health graphical element 575 indicates that its respective node is experiencing a critical health issue at its processor.

The memory health graphical element 535 represents the health of the node's 122 volatile memory, e.g., random access memory, in terms of alert conditions as described above. If one or more warning health alerts for the node are received, a graphical feature of the memory health graphical element 535 changes from a default state to a warning state, and if one or more critical health alerts for the node are received, the graphical feature of the memory health graphical element 535 changes to a critical state. The graphical feature can be any visual aspect of the memory health graphical element 535. For example, the graphical feature can be color, texture, pattern, animation, and so on. As a particular example, the default state can be a white color, the warning state can be an orange color, and the critical state can be a red color.

The storage health graphical element 540 represents the health of the node's 122 persistent storage, e.g., hard drive, in terms of alert conditions as described above. If one or more warning health alerts for the node are received, a graphical feature of the storage health graphical element 540 changes from a default state to a warning state, and if one or more critical health alerts for the node are received, the graphical feature of the storage health graphical element 540 changes to a critical state. The graphical feature can be any visual aspect of the storage health graphical element 540. For example, the graphical feature can be color, texture, pattern, animation, and so on. As a particular example, the default state can be a white color, the warning state can be an orange color, and the critical state can be a red color. In FIG. 5, a diagonal line fill pattern indicates warning state. As such, storage health graphical element 570 indicates that its respective node is experiencing a warning health issue at its non-volatile storage.

The health region 525 itself can have a default state, warning state, and critical state for a graphical feature of the health region 525, which indicates a health alert for a part of the node 122 other than the processor, memory, and storage. For example, health region 565 has a dashed outline graphical feature, which contrasts with the outline of health region 525. The dashed outline may be representative of a warning health alert for the node represented by health region 565, such as a network connection issue. In alternative embodiments, the health region 535 default state, warning state, and critical state may be different colors, such as white, orange, and red, respectively.

The running pod region 510 includes a pod group graphical element 547 representing a group of pods, running at the node represented by the node spoke graphical element 504, that do not have any active health alerts. Other node spoke graphical elements have pod graphical elements 545, which represent individual pods running at the node represented by the respective node spoke graphical element. Both the pending pod region 510 and the alerting pod region 515 use pod graphical elements 545 to represent pods until a particular number of pods, at which point the pod graphical elements 545 are replaced by a pod group graphical element 547. The particular number of pods may be based on a cluster visualization 500 size, a number of nodes visualized by the cluster visualization 500, a size of pod graphical elements 545, a size of the alerting pod region 515, and/or a size of the pending pod region 510. Pod group graphical element 547 includes a number, "22," indicative of the number of pods represented by the pod group graphical element 547. Selection of the pod group graphical element 547 opens a secondary user interface, as described below with reference to FIG. 8.

Pod graphical elements 545 represent the health of individual pods in a node. A pod graphical element 545 representing a pod without any active health alerts is situated within the running pod region 510 of its respective node's node spoke graphical element 504. A pod graphical element 545 representing a pod with at least one active health alert is situated within the alerting pod region 515 of its respective node's node spoke graphical element 504. Similar to health graphical elements, pod graphical elements 545 and pod group graphical elements 547 represent health using graphical feature states, which change responsive to receiving health alerts. For example, alerting pod region 515 includes one pod graphical element 545 with a diagonal line fill pattern, where no fill pattern corresponds to a default state, a diagonal line fill pattern corresponds to a warning state, and a crosshatched line fill pattern corresponds to a critical state. When a pod has an active health alert, its pod graphical element 545 is moved from the running pod region 510 to the alerting pod region 515. Thus, at a glance, the cluster visualization 500 can indicate relatively how many pods at each node are operating normatively (with pod graphical elements in the running pod region 510), and how many pods at each node are alerting due to one or more health alerts (with pod graphical elements in the alerting pod region 515). Pod graphical elements 545 and pod group graphical elements 547 represent the health of both pods and pod components. That is, if an alert condition for a component of a pod triggers a health alert, the pod changes graphical feature state as if a pod alert condition had triggered a health alert. The pod group graphical element 547 changes graphical feature state if at least one health alert is received for at least one pod represented by the pod group graphical element 547.

At the center of the cluster visualization 500 is the pending pod region 520. The pending pod region 520 includes pod graphical elements 545 representing pods that are not yet assigned to a particular node. Similar to the running pod region 510 and the alerting pod region 515, after a particular number of pod graphical elements 545, the pod graphical elements 545 in the pending pod region 520 are replaced by a pod group graphical element 547. Upon assignment to a particular node, a pod graphical element 545 in the pending pod region 520 is moved to the node spoke graphical element 504 of the particular node.

The cluster visualization 500 may additionally include a key 592. The key 592 provides high level information about the distributed application cluster 120 and the cluster visualization 500, such as a number of nodes, a number of pods, as well as indicators of which graphical elements correspond to which components of the distributed application cluster 120, and/or which graphical features change based on health alerts, and what the default state, warning state, and critical state are (e.g., which colors are which state). Alternative embodiments may have more, less, or other information, or may not include a key 592. For example, the key 592 may additionally provide high level information such as a number of applications running in the distributed application cluster 120, a number of configured services, a number of unconfigured services, and a most recent time of cluster data retrieval.

The cluster visualization 500 may additionally include a filter portion 594. The filter portion 594 may be used to filter the cluster data represented in the cluster visualization 500. For example, filter instructions may be input to a filter form 596 region of the filter portion 594. As particular examples, the cluster visualization 500 may be filtered by namespace, deployment, or node (e.g., such that the cluster visualization 500 only displays nodes with warning and/or critical health alerts).

The cluster visualization 500 may in some embodiments additionally include the pod chart 502, though some embodiments do not include the pod chart 502. The pod chart 502 includes a listing of pods visualized in the cluster visualization 500. The pod chart 502 may include a key row 584 indicating what each column of the chart represents, such as "node" or "pod status." Each additional row in the pod chart 502 represents a pod visualized in the cluster visualization 500. A first data row 586 represents a pod called "login-web 1" and indicates information pertaining to that pod, such as an amount of use of its processor (CPU), volatile memory (MEM), and non-volatile storage (STO). A second data row 588 represents a pod called "usr-db3" and indicates "Critical-Failed" at a "Pod Status" column. This indicates that the pod has a critical health alert. This may be emphasized by a critical emphasis graphical element 582 at that cell of the row, where the critical emphasis graphical element has a graphical feature in a critical state (e.g., red coloration, or crosshatched filling as in the figure). The second data row 588 also indicates that the node in which usr-db3 runs is in a warning state, as indicated at its cell corresponding to a "Node Status" column. This cell includes a warning emphasis graphical element 580, which has a graphical feature in a warning state (e.g., yellow coloration, or a diagonal line filling as in the figure). Though rows for two pods are included in the figure, other embodiments may include fewer or more rows, e.g., one row for each pod in the distributed application cluster 120. The pod chart 502 may be scrollable (e.g., vertically) in embodiments where there are more rows than can be fit in the pod chart 502, where scrolling moves different rows into frame.

Figure 6:
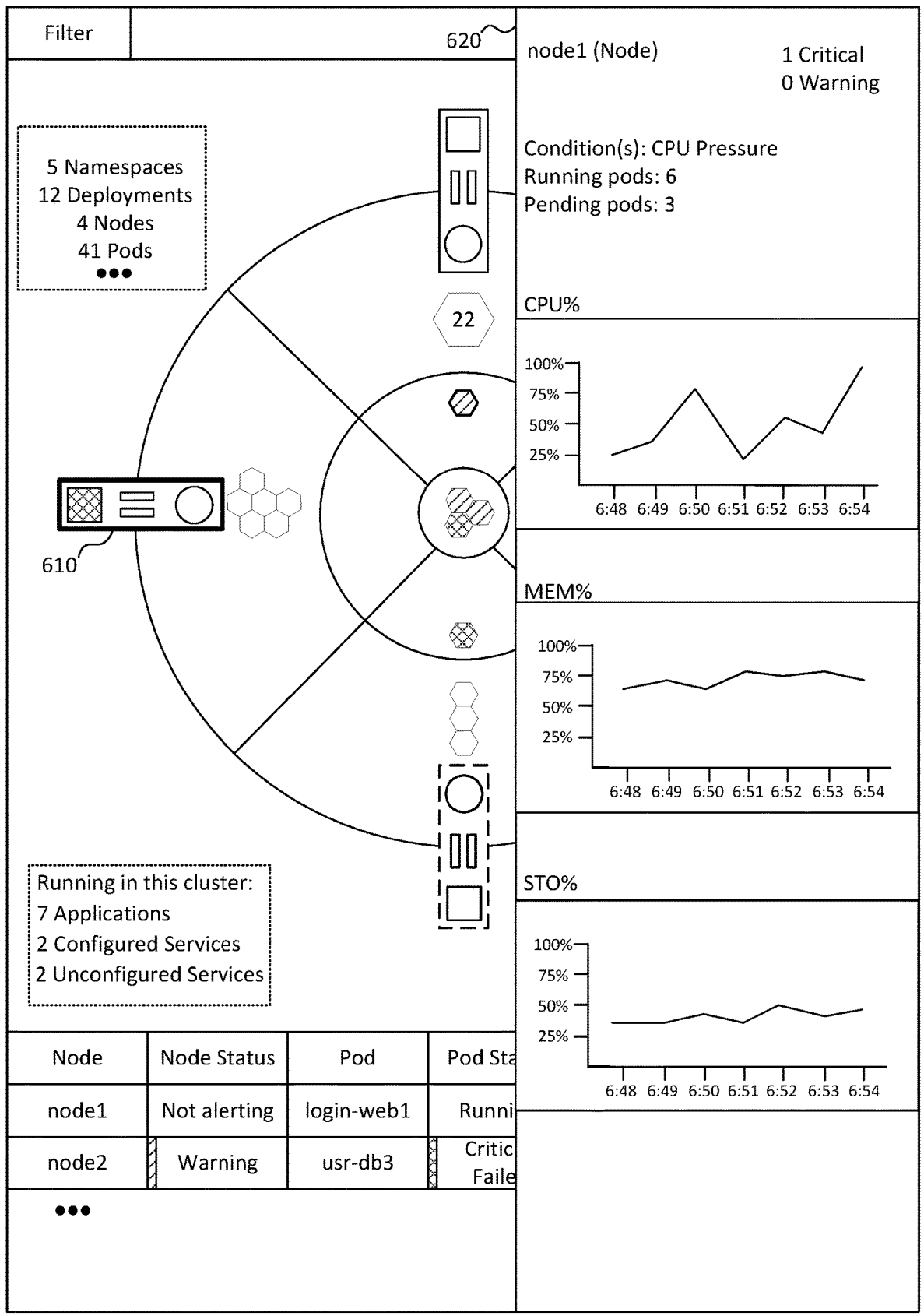
FIG. 6 illustrates an informational overlay of a primary user interface, according to one embodiment.

FIG. 6 illustrates an informational overlay of a primary user interface, according to one embodiment. Upon selection of a health region 525 or a pod graphical element 545, the cluster visualization 500 adjusts such that an informational overlay 620 with information about the node corresponding to the health region 525 overlays some or all of the cluster visualization 500. In the embodiment of FIG. 6, health region 610 is selected and informational overlay 620 includes information about health region 610. A graphical feature of selected health region 610 may change state to indicate that it is selected, such as a thickening of the border of health region 610 as in FIG. 6. Alternative embodiments may have other or additional state changes to other or additional graphical features of the selected health region 525.

The informational overlay 620 can include different information depending upon the embodiment, e.g., less, other, or additional information than in FIG. 6. In FIG. 6, the informational overlay 620 includes a name of the node, a number of critical alerts, a number of warning alerts, a list of critical and warning alerts, a number of running pods, a number of pending pods, a graph of processor usage, a graph of volatile memory usage, and a graph of non-volatile storage usage. The list of critical and warning alerts may include names for the particular health alerts, such as "CPU Pressure" indicating processor usage that has surpassed one or more alert thresholds, as described above. Each of the graphs is over a particular period of time, e.g., a particular timeframe over which cluster data was collected. The particular timeframe may be a length of time between updates to the cluster visualization 500 or a certain amount of time ranging from a most recent collection of cluster data to a specified past time, e.g., 30 minutes ago.

In an embodiment, multiple health regions 525 may be selected, and the informational overlay 620 includes information for each node corresponding to a selected region. For example, the graphs may each include a separate line for each selected health region 525. In this manner, relative performance of the respective nodes may be visualized.

Figure 7:
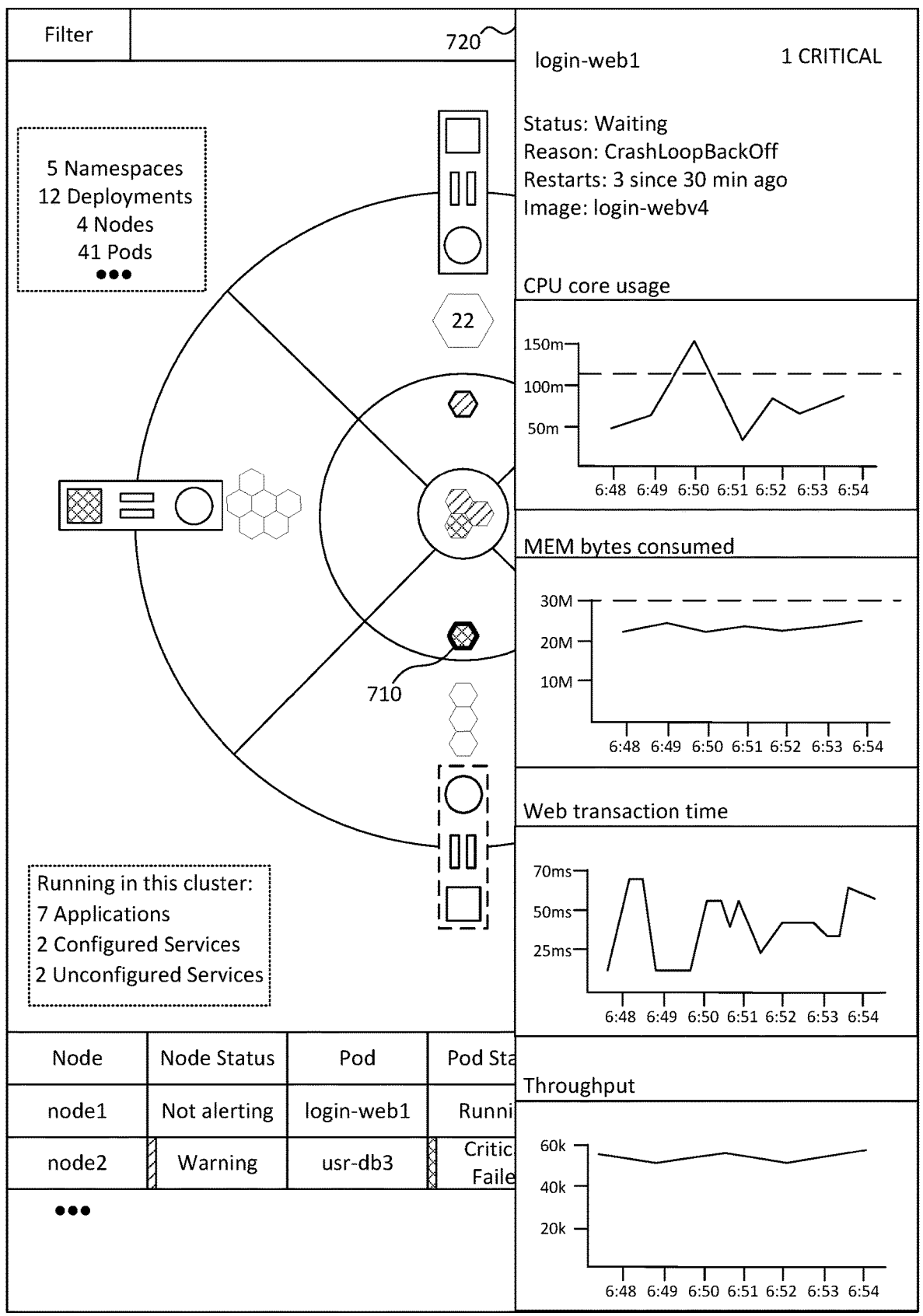
FIG. 7 illustrates a pod informational overlay, according to one embodiment.

FIG. 7 illustrates a pod informational overlay, ac 720cording to one embodiment. Upon selection of a pod graphical element 710, the cluster visualization 500 adjusts such that the pod informational overlay 720 with information about the pod corresponding to the pod graphical element 710 overlays some or all of the cluster visualization 500. A graphical feature of selected pod graphical element 710 may change state to indicate that it is selected, such as a thickening of the border of the pod graphical element 710 as in FIG. 7. Alternative embodiments may have other or additional state changes to other or additional graphical features of the selected pod graphical element 710.

The pod informational overlay 720 can include different information depending upon the embodiment. In FIG. 7, the pod informational overlay 720 includes a name of the pod, a notification that the pod has a critical alert, a status, a reason for the status, a number of restarts, an image version, a graph of processor usage, a graph of volatile memory usage, a graph of network connectivity, and a graph of throughput. The graph of processor usage visualizes the pod's processor use (e.g., in terms of clock cycles used), the graph of volatile memory use visualizes the pod's volatile memory use (e.g., in terms of bytes consumed), the graph of network connectivity visualizes the pod's web transactions (e.g., in terms of milliseconds), and the graph of throughput visualizes the pod's use with respect to the distributed application (e.g., a number of requests served). One or more graphs may have a threshold element, represented in the figure dashed lines. The threshold element may visualize a threshold at or past which triggers a health alert.

Each of the graphs is over a particular period of time, e.g., a particular timeframe over which cluster data was collected. The particular timeframe may be a length of time between updates to the cluster visualization 500 or a certain amount of time ranging from a most recent collection of cluster data to a specified past time, e.g., 30 minutes ago.

In an embodiment, multiple pod graphical elements 710 may be selected, and the pod informational overlay 620 includes information for each pod corresponding to a selected pod graphical element. For example, the graphs may each include a separate line for each selected pod graphical element 710. In this manner, relative performance of the respective pods can be visualized.

Figure 8:
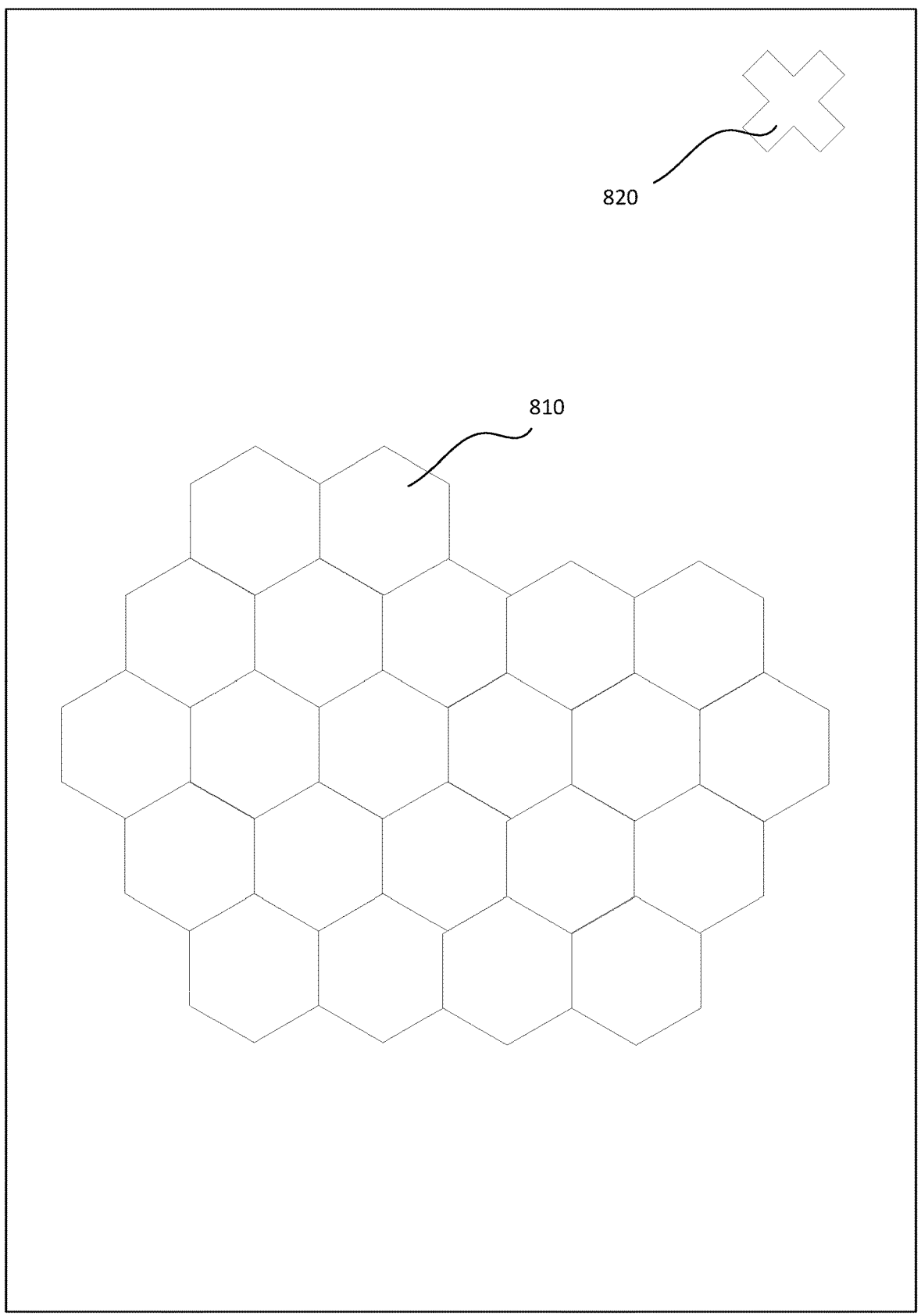
FIG. 8 illustrates a secondary user interface visualizing the structure and health of a distributed application cluster, according to one embodiment.

FIG. 8 illustrates a secondary user interface visualizing the structure and health of a distributed application cluster, according to one embodiment. As described above with reference to FIG. 5, upon selection of a pod group graphical element 547, the secondary user interface is brought to the foreground, replacing or overlaying the primary user interface. The secondary user interface includes a set of pod graphical elements 810, each corresponding to a pod in the set of pods represented by the selected pod group graphical element 547. The pod graphical elements 810 are similar to the pod graphical elements 545 of FIG. 5. If one or more pods in the set of pods has an active health alert, it is represented in the secondary user interface at the pod graphical element 810 by a change of state to one or more graphical features. Information about individual pods in the set of pods can be provided by an overlay analogous to that of FIG. 7 upon selection of a pod graphical element 810. In this manner, greater detail about the pods represented by a pod group graphical element 547 can be visualized. The secondary user interface additionally includes a closing mechanism 820, which, upon selection, returns the primary user interface to the foreground.

Figure 9A:
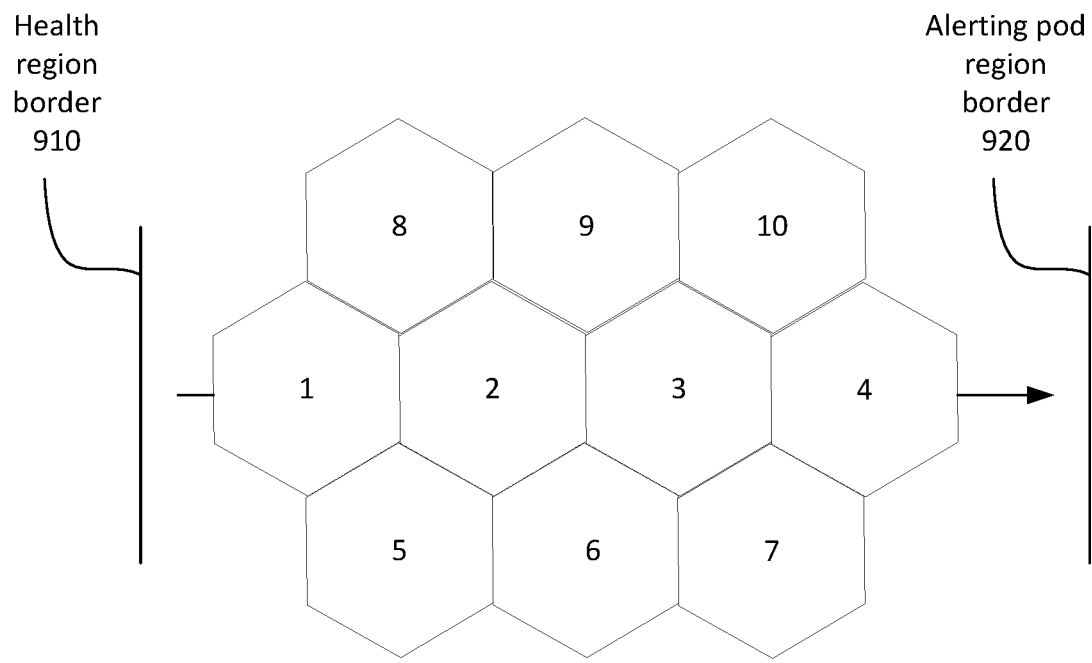
FIG. 9A illustrates a deterministic growth pattern for pod graphical elements in a primary user interface, according to one embodiment.

FIG. 9A illustrates a deterministic growth pattern for pod graphical elements in a primary user interface, according to one embodiment. The example of the figure corresponds to pod graphical elements 545 in a running pod region 510, although similar techniques apply for alerting pod regions 515 and pending pod regions 520. The first pod graphical element 545, labeled "1," is placed close to the health region 525, e.g., by the health region border 910. Additional pod graphical elements 545 are placed linearly (in numerical order) until the border between the running pod region 510 and the alerting pod region 515, alerting pod region border 920, is reached, at which point growth proceeds linearly along one side of the line of pod graphical elements 545, then the other. As mentioned above, once the region is full, e.g., has reached a maximum number of pod graphical elements 545, the pod graphical elements 545 in the region are replaced with a pod group graphical element 547.

Figure 9B:
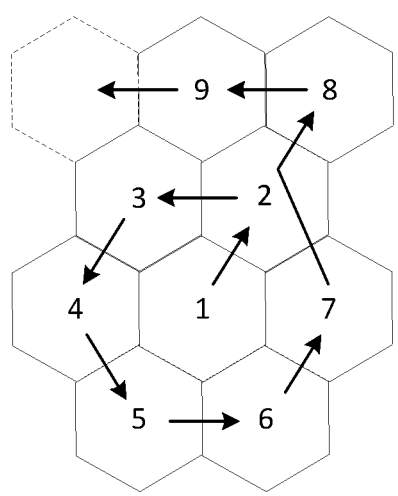
FIG. 9B illustrates a deterministic growth pattern for pod graphical elements in a secondary user interface, according to one embodiment.

FIG. 9B illustrates a deterministic growth pattern for pod graphical elements in a secondary user interface, according to one embodiment. As illustrated, a first pod graphical element 545 is placed centrally in the region, then a second pod graphical element 545 is placed above and to the right of the first pod graphical element 545, and so on, in the numerical order of the figure, looping in a circular manner. The order may be determined using a cube coordinate system. In alternative embodiments alternative growth patterns may be employed.

IV. Processed

Figure 10:
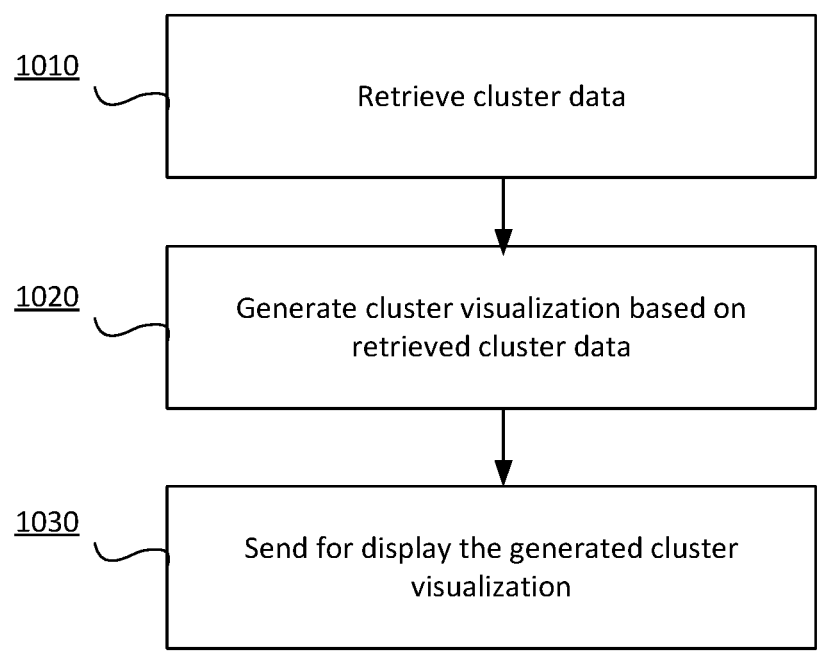
FIG. 10 illustrates a process for visualizing distributed application cluster structure and health, according to one embodiment.

FIG. 10 illustrates a process for visualizing distributed application cluster structure and health, according to one embodiment. The monitoring server 130 retrieves 1010 cluster data. For example, the monitoring server 130 receives a set of cluster data from the application monitor 250. The set of cluster data may be cluster data for a particular period of time, e.g., time since a last retrieval of cluster data.

The monitoring server 130 generates 1020 a cluster visualization based on the retrieved 910 cluster data. The cluster visualization may include a primary user interface and/or one or more secondary user interfaces. Upon generation, the monitoring server 130 sends 1030 for display the generated 1020 cluster visualization to the client device 110.

V. Computing Components

Figure 11:
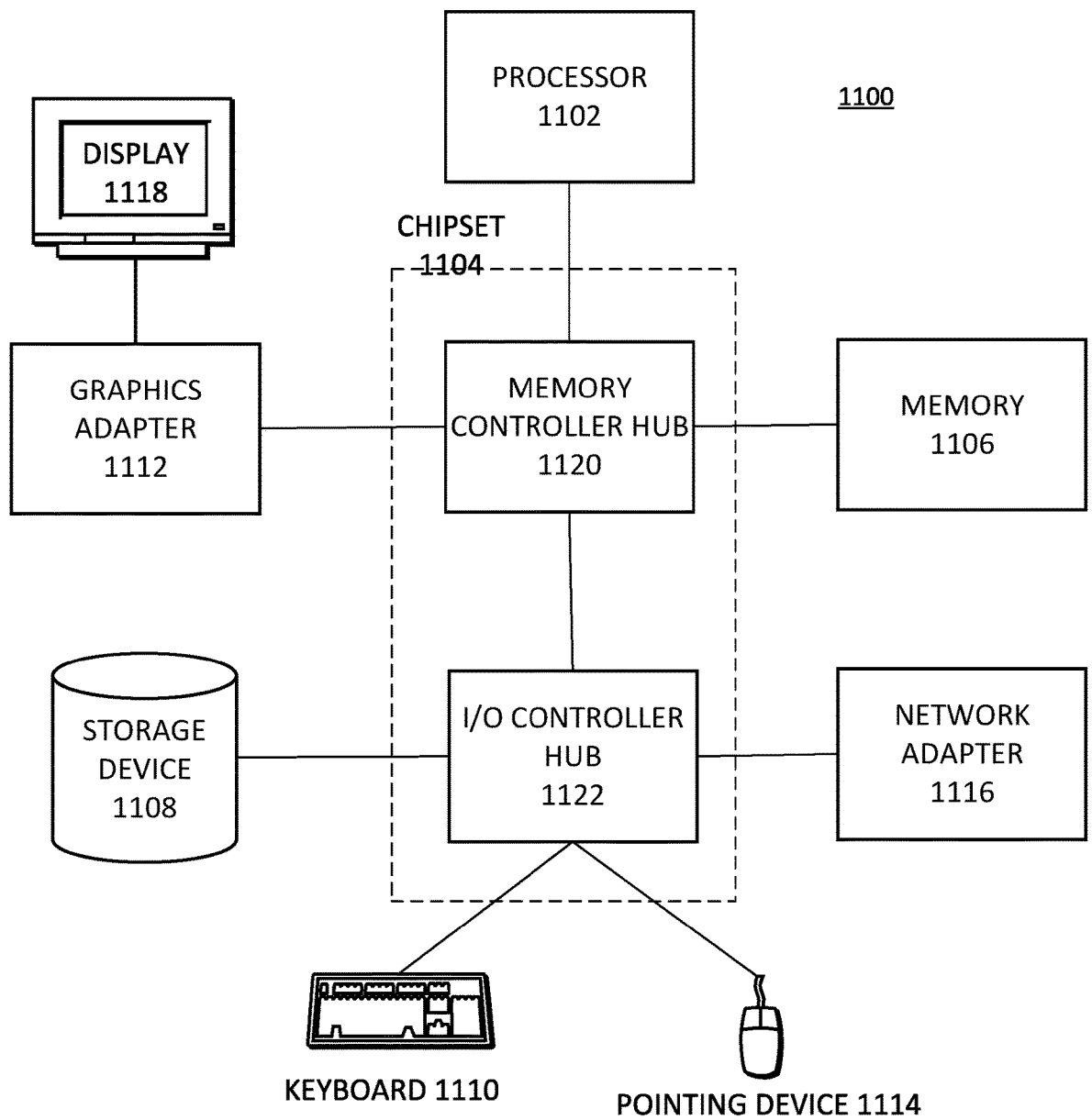
FIG. 11 is a block diagram illustrating physical components of a computer, according to one embodiment.

FIG. 11 is a high-level block diagram illustrating physical components of a computer 1100 used as part or all of the client device 110, node 122, monitoring server 130, or end device 150, according to one embodiment. Illustrated are at least one processor 1102 coupled to a chipset 1104. Also coupled to the chipset 1104 are a memory 1106, a storage device 1108, a graphics adapter 1112, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is any non-transitory computer-readable storage medium, such as a hard drive, compact disk read-only memory (CD-ROM), DVD, or a solid-state memory device. The memory 1106 holds instructions and data used by the processor 1102. The graphics adapter 1112 displays images and other information on the display 1118. The network adapter 1116 couples the computer 1100 to a local or wide area network.

As is known in the art, a computer 1100 can have different and/or other components than those shown in FIG. 11. In addition, the computer 1100 can lack certain illustrated components. In one embodiment, a computer 1100 acting as a server may lack a graphics adapter 1112, and/or display 1118, as well as a keyboard 1110 or pointing device. Moreover, the storage device 1108 can be local and/or remote from the computer 1100 (such as embodied within a storage area network (SAN)).

As is known in the art, the computer 1100 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

VI. Additional Considerations

The disclosed cluster visualization techniques may provide several advantages over existing user interfaces, as described above. One of skill in the art may recognize additional advantages that may be realized using the described techniques.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process visualizing data using bubbles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, comprising:
retrieving cluster data for a cluster comprising one or more nodes and one or more pods;
displaying, on a visual interface, a cluster visualization based on the retrieved cluster data, wherein the cluster visualization comprises, for each of the one or more nodes, a node spoke graphical element comprising a pod region indicating pods of the node and a health region indicating one or more health metrics of the node;
wherein a particular pod of the one or more pods in the cluster data is represented in the cluster visualization by a pod graphical element at the pod region of a node graphical element of a node corresponding to the particular pod, and a graphical feature of the pod graphical element is indicative of at least one of one or more health metrics of the particular pod and one or more health metrics of a pod element within the particular pod;
determining, based on the retrieved cluster data and an alert condition for the particular pod, that particular cluster data of the particular pod surpasses an alert threshold; and
responsive to determining that the particular cluster data of the particular pod surpasses the alert threshold, moving the pod graphical element from a running pod region of the pod region of the node graphical element to an alerting pod region of the pod region of the node graphical element.

2. The method of claim 1, further comprising:
receiving a selection of the pod graphical element; and
displaying, on the visual interface, an updated cluster visualization comprising an overlay graphical element representing information about the pod represented by the pod graphical element.

3. The method of claim 1, further comprising:
receiving a selection of a pod group graphical element, wherein the pod group graphical element represents a set of pods; and
displaying, on the visual interface, a second cluster visualization comprising a set of pod graphical elements each representative of one pod in the set of pods.

4. The method of claim 1, wherein pod graphical elements representing pods in the node with one or more health alerts are in the alerting pod region, and pod graphical elements representing pods in the node without health alerts are in the running pod region.

5. The method of claim 1, wherein the cluster visualization further comprises a pending pod region, and pod graphical elements representing unassigned pods are in the pending pod region.

6. The method of claim 1, wherein the graphical feature of the pod graphical element is based on one or more alert conditions.

7. The method of claim 1, wherein each health region comprises at least one of a processor health graphical element representative of processor usage by the node, a memory health graphical element representative of random access memory usage by the node, and a storage health graphical element representative of persistent storage usage by the node.

8. A non-transitory computer-readable storage medium storing computer program instructions executable by a processor to perform operations, the operations comprising:
retrieving cluster data for a cluster comprising one or more nodes and one or more pods;
displaying, on a visual interface, a cluster visualization based on the retrieved cluster data, wherein the cluster visualization comprises, for each of the one or more nodes, a node spoke graphical element comprising a pod region indicating pods of the node and a health region indicating one or more health metrics of the node;
wherein a particular pod of the one or more pods in the cluster data is represented in the cluster visualization by a pod graphical element at the pod region of a node graphical element of a node corresponding to the particular pod, and a graphical feature of the pod graphical element is indicative of at least one of one or more health metrics of the particular pod and one or more health metrics of a pod element within the particular pod;
determining, based on the retrieved cluster data and an alert condition for the particular pod, that particular cluster data of the particular pod surpasses an alert threshold; and
responsive to determining that the particular cluster data of the particular pod surpasses the alert threshold, moving the pod graphical element from a running pod region of the pod region of the node graphical element to an alerting pod region of the pod region of the node graphical element.

9. The non-transitory computer-readable storage medium of claim 8, the operations further comprising:
receiving a selection of the pod graphical element; and displaying, on the visual interface, an updated cluster visualization comprising an overlay graphical element representing information about the pod represented by the pod graphical element.

10. The non-transitory computer-readable storage medium of claim 8, the operations further comprising:
   receiving a selection of a pod group graphical element, wherein the pod group graphical element represents a set of pods; and
   displaying, on the visual interface, a second cluster visualization comprising a set of pod graphical elements each representative of one pod in the set of pods.

11. The non-transitory computer-readable storage medium of claim 8, wherein pod graphical elements representing pods in the node with one or more health alerts are in the alerting pod region, and pod graphical elements representing pods in the node without health alerts are in the running pod region.

12. The non-transitory computer-readable storage medium of claim 8, wherein the cluster visualization further comprises a pending pod region, and pod graphical elements representing unassigned pods are in the pending pod region.

13. The non-transitory computer-readable storage medium of claim 8, wherein the graphical feature of the pod graphical element is based on one or more alert conditions.

14. The non-transitory computer-readable storage medium of claim 8, wherein each health region comprises at least one of a processor health graphical element representative of processor usage by the node, a memory health graphical element representative of random access memory usage by the node, and a storage health graphical element representative of persistent storage usage by the node.

15. A system, comprising:
   a processor; and
   a non-transitory computer-readable storage medium storing computer program instructions executable by the processor to perform operations, the operations comprising:
      retrieving cluster data for a cluster comprising one or more nodes and one or more pods;
      displaying, on a visual interface, a cluster visualization based on the retrieved cluster data, wherein the cluster visualization comprises, for each of the one or more nodes, a node spoke graphical element comprising a pod region indicating pods of the node and a health region indicating one or more health metrics of the node;
      wherein a particular pod of the one or more pods in the cluster data is represented in the cluster visualization by a pod graphical element at the pod region of a node graphical element of a node corresponding to the particular pod, and a graphical feature of the pod graphical element is indicative of at least one of one or more health metrics of the particular pod and one or more health metrics of a pod element within the particular pod,
      determining, based on the retrieved cluster data and an alert condition for the particular pod, that particular cluster data of the particular pod surpasses an alert threshold; and
      responsive to determining that the particular cluster data of the particular pod surpasses the alert threshold, moving the pod graphical element from a running pod region of the pod region of the node graphical element to an alerting pod region of the pod region of the node graphical element.

16. The system of claim 15, the operations further comprising:
   receiving a selection of the pod graphical element; and
   displaying, on the visual interface, an updated cluster visualization comprising an overlay graphical element representing information about the pod represented by the pod graphical element.

17. The system of claim 15, the operations further comprising:
   receiving a selection of a pod group graphical element, wherein the pod group graphical element represents a set of pods; and
   displaying, on the visual interface, a second cluster visualization comprising a set of pod graphical elements each representative of one pod in the set of pods.

18. The system of claim 15, wherein pod region and an alerting pod region, pod graphical elements representing pods in the node with one or more health alerts are in the alerting pod region, and pod graphical elements representing pods in the node without health alerts are in the running pod region.

19. The system of claim 15, wherein the cluster visualization further comprises a pending pod region, and pod graphical elements representing unassigned pods are in the pending pod region.

20. The system of claim 15, wherein the graphical feature of the pod graphical element is based on one or more alert conditions.

* * * * *

UNITED STATES PATENT AND TRADEMARK OFFICE
CERTIFICATE OF CORRECTION

PATENT NO. : 11,178,245 B2  
APPLICATION NO. : 16/459278  
DATED : November 16, 2021  
INVENTOR(S) : Hilber et al.

Page 1 of 1

It is certified that error appears in the above-identified patent and that said Letters Patent is hereby corrected as shown below:

In the Claims

In Column 18, in Claim 15, Line 9, delete "pod," and insert -- pod; --, therefor.

In Column 18, in Claim 18, Lines 34-35, after "wherein" delete "pod region and an alerting pod region,".

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*